United States Patent
Kaga et al.

(10) Patent No.: US 6,826,448 B2
(45) Date of Patent: Nov. 30, 2004

(54) CEMENT DISTRIBUTION SYSTEM

(75) Inventors: Kikuo Kaga, Kanagawa (JP); Haruo Kaga, Kanagawa (JP); Kenji Umeda, Kanagawa (JP); Takeyoshi Hirai, Kanagawa (JP); Shunsaku Wakabayashi, Kanagawa (JP)

(73) Assignee: Mitomo Corporation, Kanagawa (JP)

( * ) Notice: Subject to any disclaimer, the term of this patent is extended or adjusted under 35 U.S.C. 154(b) by 0 days.

(21) Appl. No.: 10/265,384

(22) Filed: Oct. 7, 2002

(65) Prior Publication Data

US 2003/0091390 A1 May 15, 2003

(30) Foreign Application Priority Data

Oct. 25, 2001 (JP) ........................................ 2001-327298
Jan. 28, 2002 (JP) ........................................ 2002-018325

(51) Int. Cl.$^7$ ............................................ G06F 17/00
(52) U.S. Cl. ...................... 700/231; 700/90; 700/213; 700/216; 222/160
(58) Field of Search .................. 700/90, 213, 214, 700/216, 231; 166/278, 281, 123; 222/1, 160

(56) References Cited

U.S. PATENT DOCUMENTS

| | | | | | |
|---|---|---|---|---|---|
| 4,406,548 A | * | 9/1983 | Haws | ............................ | 366/8 |
| 5,730,523 A | * | 3/1998 | Flood | ........................... | 366/18 |
| 6,042,259 A | * | 3/2000 | Hines et al. | ................... | 366/17 |
| 6,377,189 B1 | * | 4/2002 | Newman | .................. | 340/854.6 |

FOREIGN PATENT DOCUMENTS

JP         403009810 A    *   1/1991

* cited by examiner

*Primary Examiner*—Jayprakash N. Gandhi
(74) *Attorney, Agent, or Firm*—Wenderoth, Lind & Ponack L.L.P.

(57) ABSTRACT

A cement packing vehicle includes a cement accommodating unit and an automatic packing machine for packing a predetermined quantity of powdery cement. A powdery cement service center supplies powdery cement to the cement packing vehicle. According to an order from packed-cement purchaser, the vehicle personnel in the cement packing vehicle pack the required quantity of cement by using the automatic packing machine in the cement packing vehicle, and directly distribute the packed cement to the packed cement purchaser.

8 Claims, 2 Drawing Sheets

CEMENT DISTRIBUTION SYSTEM

BACKGROUND OF THE INVENTION

1. Field of the Invention

This invention relates to a system for distributing packed cement and, more particularly, to a cement distribution system, which permits greatly simplifying the distribution and allows quick and smooth distribution of high quality packed cement.

2. Prior Art

Heretofore, as the form of cement distribution in the market, there have been a method in which powdery cement is transported in a cement accommodating unit mounted in a cement transport vehicle to big quantity requesters, and a method, in which packed cement is transported on a truck to moderate quantity requesters such as construction material shows and retail sales shops.

In the prior art packed cement distribution system, powdered cement is transported from a cement manufacturing plant to a packing plant (or a packing department in the manufacturing plant), and packed cement obtained therein is transported by a large-scale 10-ton truck or the like to a large service center controlling area. From this service center (and sometimes via a small-scale service center), packed cement is distributed by a small truck or the like to construction material shops or similar small shops and moderate quantity requesters whenever an order is received.

The packed cement is formed by considering the relative humidity resistance and the handling property of powdery cement. However, even packed cement may be deteriorated in quality by absorbing moisture over a long stock time. Therefore, in construction material shops or similar small shops, it is not suitable to stock a large quantity of cement. Besides, for stocking a large quantity of cement, it is necessary to prepare a place, such as an expensive warehouse. Therefore, it has been inevitable to make frequent moderate quantity orders. Furthermore, in the above prior art packed cement distribution system, the management of packed cement in the service center requires great cost and man-hours necessary in a vast place, and the moderate quantity distribution from the service center to purchasers requires a large amount of time and man-hours. Therefore, it has been difficult to cope with packed cement sales price reduction as demanded by the market.

SUMMARY OF THE INVENTION

It is an object of the invention to provide a cement distribution system which simplifies a packed cement distribution system for greatly reducing manual labor, time and cost required for the distribution, and which permits quick and smooth distribution of desired quantities of high quality cement.

DETAILED DESCRIPTION OF THE PREFERRED EMBODIMENTS

Figure 1:
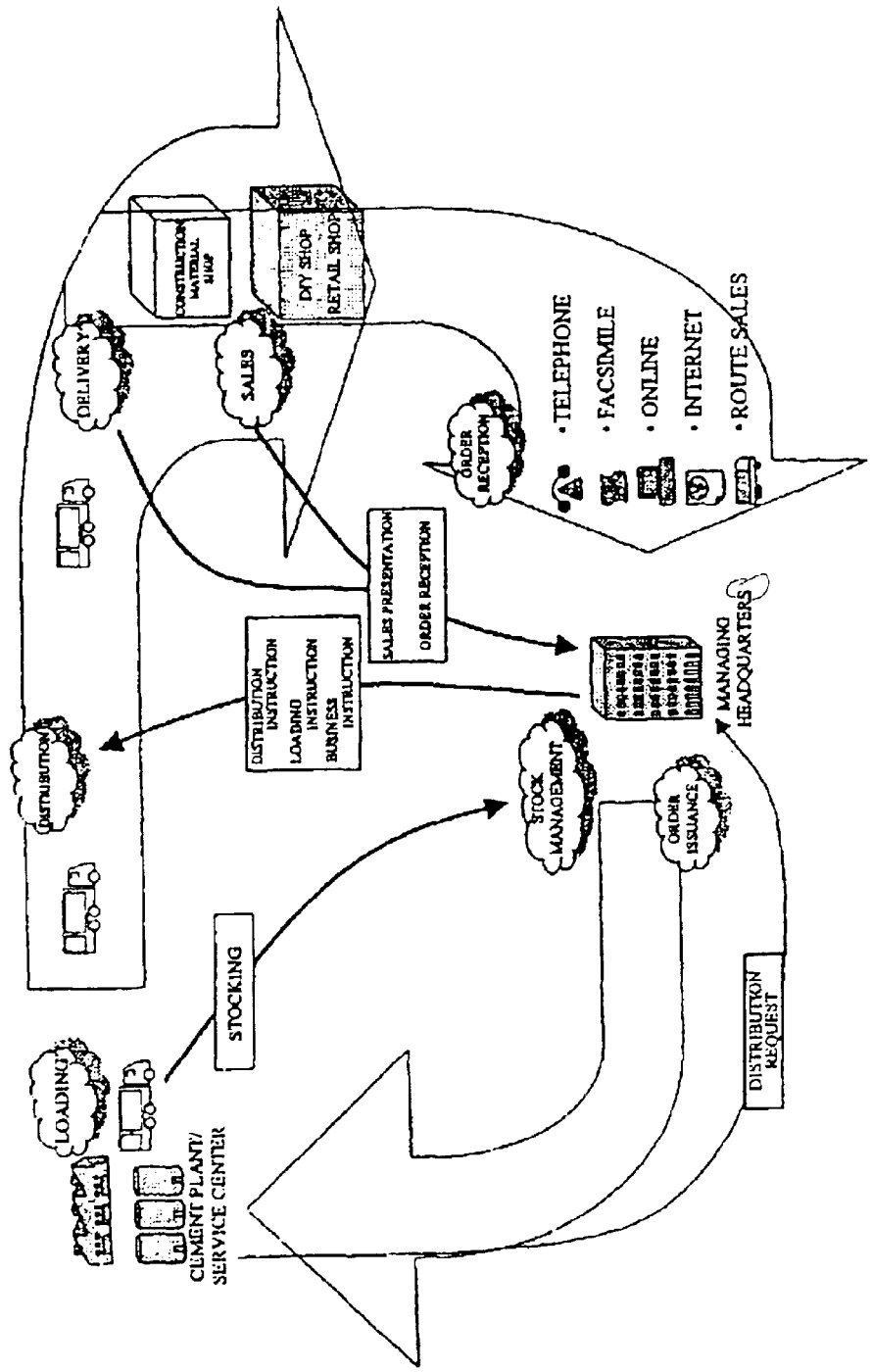
FIG. 1 is a system diagram showing a cement distribution system according to the invention.
Figure 2:
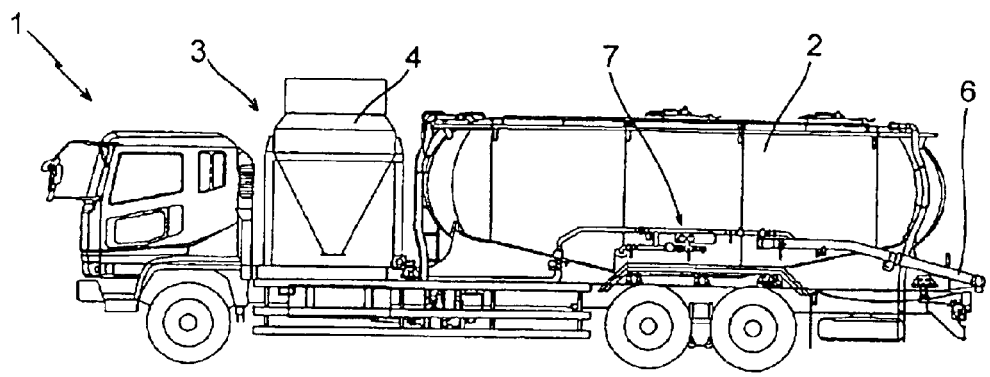
FIG. 2 is an elevation view illustrating an example of a cement packing vehicle used in the cement distribution system according to the invention.

FIG. 1 shows a cement distribution system according to the invention. In this system, it is important that a managing headquarters collectively acts as a center of cement distribution and manages the reception of orders from construction material shops or similar small shops, and instructs the distribution of cement to new cement packing vehicles 1. The cement packing vehicle, as shown in FIG. 2, is a trailer including a cement accommodating unit 2 with a capacity of about 10 tons, and an automatic packing machine 3 having a hopper-like tank 4 with a capacity of about 1 ton for packing the accommodated powdery (powdered) cement. The cement which is accommodated in the cement accommodating unit 2 is not limited to 100% cement, but it may be powdery blend cement obtained by adding various additive materials to cement.

In detail, the automatic packing machine 3 in the cement packing vehicle 1 includes, in addition to the tank 4 noted above, an automatic bag feeding machine (not shown) for handling bags (of an inner valve type) to be packed with powdery cement one-by-one and for opening the bags, and an automatic fixed quantity charging machine (not shown) for measuring powdery cement and charging the measured powdery cement into each of these bags. The inner valve type bag has a valve body functioning as an inner lid, which is provided in an upper open portion of the bag. By charging powdery cement into the bag by inserting a nozzle into the open portion of the bag and then turning down the bag, the charged powdery cement pushes the valve body to seal the opening. That is, no step of sealing the opening is needed. For space saving, bags may be manually handled without provision of any automatic bag feeding machine.

Figure 3:
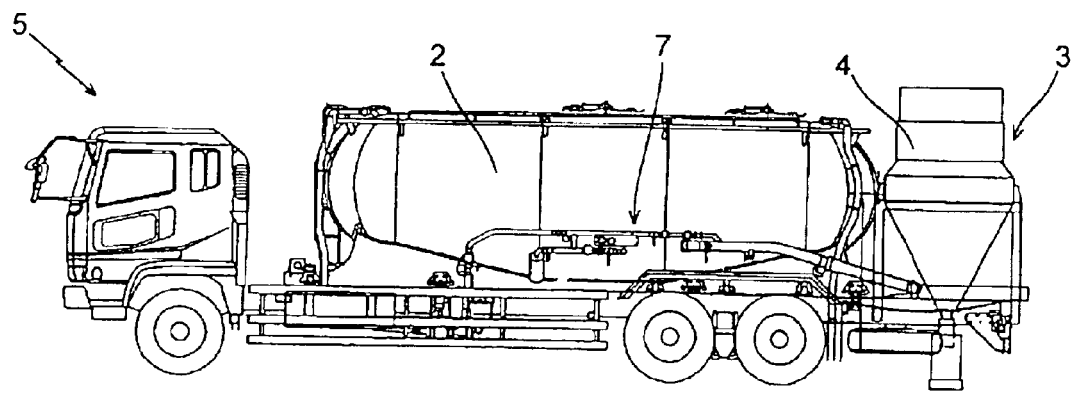
FIG. 3 is an elevation view illustrating a different example of the cement packing vehicle used in the cement distribution system according to the invention.

The mounting location for the automatic packing machine 3 in the cement packing vehicle 1 is not limited to the neighborhood of the vehicle center as shown in FIG. 2. For example, the automatic packing machine 3 may be located at a rear part of the vehicle 5 as in a different example of the cement packing vehicle shown in FIG. 3. If the automatic packing machine 3 is located at the vehicle center, excellent weight balance can be obtained. If the automatic packing, machine 3 is located at a rear part of the vehicle, however, improved operation control concerning the packing can be achieved.

The tank 4 is provided with a sensor for detecting the quantity of the accommodated cement, and powdery cement is always fed out under pressure from the cement accommodating unit 2. Although not shown, the cement packing vehicle 1 also has a compressor for feeding under pressure the powdery cement in the cement accommodating unit 2, a dust collector machine for collecting cement particles flying up in the tank 4, an operating board for carrying out (i.e., controlling) the packing operation, a weighing unit for weighing the inner valve type bag placed thereon, a control circuit for automatically controlling the quantity of powdery cement discharged from the tank 4 according to the measurement of the weighing unit (i.e., the weight of the cement pack), a dust withdrawing unit for withdrawing cement particles flying up to the outside of the bag, and a converter for converting a DC power supply of the vehicle to AC current for driving the automatic packing machines 3. As for the quantity of cement charged into the bag, in the case of, for instance, 25 kg packing, about 25.5 kg is a center value to be preset in the control circuit so that the charged cement quantity does not become less than a rated value due to slight quantity fluctuations.

The cement packing vehicle 1 does not only feed out powdery cement in the cement accommodating unit 2 into the tank 4, but it also has a switching mechanism 7 for feeding out powdery cement via a hose 6 to the outside. In other words, the cement packing vehicle 1 according to the invention is not only used for packing powdery cement into containers such as bags, but it is also utilized for delivering powdery cement without packing the powdery cement into containers. Furthermore, it is also possible to cleanly discharge powdery cement residue in the cement accommodating unit 2 after the end of an operation and to load new powdery cement before the next delivery.

The operator in the cement packing vehicle 1 who drives the vehicle and conducts the packing operation has a portable communication terminal for communication with the managing headquarters for managing the distribution of cement. This portable terminal includes a portable telephone set for the purposes of data communication with the managing headquarters and packet communication via electronic mails, and it also includes a ten-key set for settlement data inputting, a card reader, a printer function for issuing receipts and so forth. As shown in FIG. 1, the operator of the cement packing vehicle 1 receives powdery cement in the cement accommodating unit 2 at a cement plant (i.e., a cement service center) according to instructions from the managing headquarters for managing the cement distribution, and also drives the vehicle after receiving instructions from the managing headquarter for distributing packed cement to construction material shops or similar small shops which are packed-cement purchasers.

At the site of a packed-cement purchaser, the personnel in the vehicle packs the necessary quantity of cement by operating the automatic packing machine 3 of the cement packing vehicle 1, and delivers the packed cement to the purchaser. In the case of a cement packing vehicle having an area for accommodating packed cement, packing of powdery cement using the automatic packing machine may be made before arrival at the distribution destination. The settlement process concerning the delivery is done without the use of a paper slip, but by using the portable terminal. For example, a written delivery is issued from the portable terminal, or a user card of the purchaser is scanned with a card reader of the portable terminal. As a result, sales data is transmitted by packet communication to the managing headquarters and presented to a managing server in the managing headquarters. The settlement by the purchaser may be made by (1) usual monthly blocking, debit note issuance and transfer (or bill issuance), (2) cash payment or (3) the use of a credit card or a debit card. In either case, the method of settlement is transmitted from the portable terminal to the managing headquarters. If the purchaser utilizes a credit card or the like, scanning with the portable terminal card reader is conducted, preliminary transmission/inquiry of credit data is made by packet communication for processing in a credit or like settlement server in the managing headquarters, and the receipt is issued by the portable terminal.

When the packed-cement delivery and settlement process have been done in one place, the managing headquarters instructs the vehicle personnel via the portable terminal in the cement packing vehicle 1 of the distribution location for the next purchaser. Alternatively, information concerning each distribution center for the day may be provided. The managing headquarters provides instructions to the vehicle personnel in consideration of the distribution places of purchasers in such a way that the cement packing vehicle 1 can make distribution along the shortest route and in the shortest amount of time. The managing headquarter also calculates the quantity of cement loaded in the cement accommodating unit and the delivery quantity, and at this time it instructs the vehicle personnel as to whether powdery cement in the cement plant or in the cement service center is to be loaded. Furthermore, data concerning the load of powdery cement in the cement plant or the like is transmitted from the portable terminal to the managing headquarters.

While the above embodiment has been described in connection with the delivery of powdery cement as packed cement, not only packed cement but also non-packed powdery cement, if necessary, may be delivered by weighing.

As has been described in the foregoing, with the cement distribution system according to the invention, the packed cement distribution system is simplified to permit reduction of packing man-hours in the plant, elimination of wasteful packed cement stock in the distribution stage, a great reduction of the labor, time and cost required for the distribution, and efficient, quick and smooth distribution of desired quantities of high quality cement.

Also, the cement packing vehicle is provided with a portable terminal which is wirelessly coupled to a personal computer in a managing headquarters for receiving orders from packed-cement purchasers, and the managing headquarters instructs the cement packing vehicle of the distribution route via the portable terminal. The managing headquarters thus can provide efficient cement distribution instructions to the cement packing vehicle, and can realize suitable collective one-place management of the packed-cement distribution.

Furthermore, the portable terminal provided in the cement packing vehicle, when packed cement delivery data is inputted thereto, transmits price settlement data to the managing headquarters. Thus, on-line instant settlement between the purchaser and the managing headquarters is possible in lieu of the conventional settlement with a paper slip, which requires labor and time, and suitable sales management can be realized.

Yet further, the cement packing vehicle, in addition to feeding powdery cement from the cement accommodating unit to the automatic packing machine, has a switching means for feeding out cement to the outside of the vehicle via a hole. Thus, it is possible not only to pack powdery cement with the automatic packing means, but also to deliver non-packed powdery cement. Still further, it is possible to cleanly discharge powdery cement remaining in the cement accommodating unit after the end of operation, and to load new powdery cement before the next delivery.

What is claimed is:

1. A cement distribution system comprising:
   a powdered cement packing vehicle including a cement accommodating unit for storing powdered cement, and an automatic packing machine for packing the powdered cement stored in said cement accommodating unit into containers in predetermined quantities; and
   a powdered cement service center for supplying the powdered cement into said cement accommodating unit of said powdered cement packing vehicle;
   wherein said powdered cement packing vehicle is operable to pack a desired quantity of the powdered cement into containers based on an order from a cement purchaser, and is operable to directly deliver the packed cement to the cement purchaser.

2. The cement distribution system of claim 1, wherein said powdered cement packing vehicle further includes a portable communication terminal;
   said cement distribution system further comprising a managing headquarters including a computer wirelessly connected to said portable communication terminal of said powdered cement packing vehicle, said managing headquarters being operable to receive orders from the cement purchaser, and to transmit powdered cement distribution information to said powdered cement packing vehicle via said portable communication terminal.

3. The cement distribution system of claim 2, wherein said powdered cement packing vehicle is operable to transmit price settlement data to said computer of said managing headquarters via said portable communication terminal.

4. The cement distribution system of claim 1, wherein said powdered cement packing vehicle further includes a switching mechanism for feeding the powdered cement from said powdered cement packing vehicle.

5. The cement distribution system of claim 4, wherein said powdered cement packing vehicle further includes a distribution hose for distributing the powdered cement, said switching mechanism being operable to switch a distribution of the powdered cement stored in said cement accommodating unit from said automatic packing machine to said distribution hose.

6. The cement distribution system of claim 1, wherein said automatic packing machine is operable to pack an adjustable predetermined quantity of powdered cement into each of a plurality of bags.

7. The cement distribution system of claim 1, wherein said automatic packing machine is located at a center of said powdered cement packing vehicle.

8. The cement distribution system of claim 1, wherein said automatic packing machine is located at a rear end of said powdered cement packing vehicle.

* * * * *